(12) United States Patent
McConville et al.

(10) Patent No.: US 10,974,495 B2
(45) Date of Patent: Apr. 13, 2021

(54) THERMAL MANAGEMENT METHODS AND APPARATUS FOR PRODUCING UNIFORM MATERIAL DEPOSITION AND CURING FOR HIGH SPEED THREE-DIMENSIONAL PRINTING

(71) Applicant: Xerox Corporation, Norwalk, CT (US)

(72) Inventors: Paul J. McConville, Webster, NY (US); Hong Zhao, Glen Allen, VA (US); Charles T. Facchini, II, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 614 days.

(21) Appl. No.: 14/852,915

(22) Filed: Sep. 14, 2015

(65) Prior Publication Data
US 2017/0072626 A1    Mar. 16, 2017

(51) Int. Cl.
| | |
|---|---|
| *B33Y 10/00* | (2015.01) |
| *B33Y 50/02* | (2015.01) |
| *B33Y 30/00* | (2015.01) |
| *B29C 35/00* | (2006.01) |
| *B29C 64/112* | (2017.01) |
| *B29C 70/20* | (2006.01) |
| *B29C 64/40* | (2017.01) |

(52) U.S. Cl.
CPC ............ *B33Y 50/02* (2014.12); *B29C 35/007* (2013.01); *B29C 64/112* (2017.08); *B33Y 10/00* (2014.12); *B33Y 30/00* (2014.12); *B29C 64/40* (2017.08); *B29C 70/20* (2013.01)

(58) Field of Classification Search
CPC .............................. B29C 64/20; B29C 64/295
See application file for complete search history.

(56) References Cited

U.S. PATENT DOCUMENTS

| | | | |
|---|---|---|---|
| 6,162,378 A | 12/2000 | Bedal et al. | |
| 7,236,166 B2 | 6/2007 | Zinniel et al. | |
| 7,958,841 B2 | 6/2011 | Kritchman et al. | |
| 8,197,024 B2 * | 6/2012 | Kovacs | B41J 29/377 347/18 |

(Continued)

FOREIGN PATENT DOCUMENTS

CN          10355240 A          2/2014

*Primary Examiner* — Matthew J Daniels
*Assistant Examiner* — Andrew D Graham
(74) *Attorney, Agent, or Firm* — Maginot Moore & Beck LLP

(57) ABSTRACT

A three-dimensional object printing system comprises a ejectors configured to eject drops of material towards a platen, a heater, a sensor configured to sense temperature of the ejected material, a radiator configured to direct radiation to the ejected material, a cooler configured to cool the ejected material, and a controller operatively connected to the ejectors, heater, sensor radiator and cooler. The controller is configured to control the ejectors to form layers of material for a three-dimensional object on the surface of the platen with reference to image data of the three-dimensional object, to operate the heater to heat the surface of the platen, to compare a temperature signal received from the sensor to a predetermined threshold, to operate the radiator to radiate the object layers, and to operate the cooler to attenuate heat produced by the radiated material in response to the signal from sensor exceeding the predetermined threshold.

7 Claims, 3 Drawing Sheets

(56) References Cited

U.S. PATENT DOCUMENTS

| | | | |
|---|---|---|---|
| 8,636,494 B2 | 1/2014 | Gothait et al. | |
| 2010/0191360 A1* | 7/2010 | Napadensky | B29C 64/20 700/98 |
| 2011/0241240 A1 | 10/2011 | Gothait et al. | |
| 2011/0313560 A1* | 12/2011 | Hangaard | B33Y 40/00 700/120 |
| 2013/0073073 A1* | 3/2013 | Pettis | B29C 64/106 700/119 |
| 2013/0101803 A1* | 4/2013 | Grebe | B29C 67/007 428/172 |
| 2013/0327917 A1* | 12/2013 | Steiner | F16M 11/12 248/649 |
| 2015/0108687 A1* | 4/2015 | Snyder | B29C 64/106 264/308 |
| 2015/0174658 A1* | 6/2015 | Ljungblad | B33Y 10/00 419/55 |
| 2015/0174824 A1* | 6/2015 | Gifford | B29C 64/209 425/183 |
| 2015/0246481 A1* | 9/2015 | Schlick | B29C 35/00 264/461 |
| 2015/0306823 A1* | 10/2015 | Askedall | B29C 64/20 425/131.1 |
| 2016/0031159 A1* | 2/2016 | Church | B33Y 30/00 264/308 |
| 2016/0236414 A1* | 8/2016 | Reese | G05B 19/4099 |

* cited by examiner

THERMAL MANAGEMENT METHODS AND APPARATUS FOR PRODUCING UNIFORM MATERIAL DEPOSITION AND CURING FOR HIGH SPEED THREE-DIMENSIONAL PRINTING

TECHNICAL FIELD

The system and method disclosed in this document relate to printers that produce three-dimensional objects and, more particularly, to high speed three-dimensional object printers that produce uniform material deposition and curing of printed three-dimensional objects.

BACKGROUND

Digital three-dimensional manufacturing, also known as digital additive manufacturing, is a process of making a three-dimensional solid object of virtually any shape from a digital model. Three-dimensional object printing is an additive process in which one or more printheads eject successive layers of material on a substrate in different shapes. Typically, ejector heads, which are similar to inkjet printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional object printing is distinguishable from traditional object-forming techniques, which mostly rely on the removal of material from a work piece by a subtractive process, such as cutting or drilling.

While three-dimensional object printers that utilize ejectors in the form of printheads have emerged as an additive manufacturing technique that can provide high resolution of jetted and UV cured polymer three-dimensional objects, a continuing need exists for improvement in the processing speed and productivity of three-dimensional object printing systems. Use of multiple printheads has been proposed to increase speed by depositing build materials and support materials at a higher jetting frequency during fewer passes of the printheads, such as a single pass. However, problems are associated with the higher jetting frequency and fewer passes. For example, the volume of build material and support material ejected during printing can be up to approximately 10 times higher than previous three-dimensional object printers over the same, or shorter, period of time. Since the droplets of build and support material are ejected at an elevated temperature, the increased rate of ejection by the printer can raise the temperature of the portion of the part already formed, thereby detrimentally affecting part accuracy of ejected material. In addition, for UV curable build and support materials, the curing process is exothermic. Therefore, an amount of heat is released during UV curing depending on the ink reactive components, diluents and additives, and curing temperature which further heats the printer part and detrimentally affects part accuracy. Moreover, when the part is brought into the printing zone for the next layer deposition, it carries all the thermal history of the part and very likely is not in a desirable temperature state.

Therefore, a need exists for a three-dimensional object printer that compensates for the thermal effects that occur during higher speed printing.

SUMMARY

A three-dimensional object printing system in one embodiment comprises a plurality of ejectors configured to eject drops of material, a platen positioned opposite the plurality of ejectors to enable three-dimensional object formation on a surface of the platen with the ejected drops of material, a heater configured to heat the surface of the platen, a sensor configured to generate a signal corresponding to a temperature of the ejected material on the three-dimensional object being formed on the surface of the platen, a radiator configured to direct radiation onto the ejected material of the three-dimensional object, a cooler configured to cool the ejected material of the three-dimensional object, and a controller operatively connected to the plurality of ejectors, the heater, the sensor, the radiator, and the cooler.

The controller is configured to operate the plurality of ejectors to eject the drops of material towards the platen to form layers of material with reference to digital image data of the three-dimensional object to produce the three-dimensional object on the surface of the platen, to operate the heater to heat the surface of the platen, to compare the signal received from the sensor to a predetermined threshold, to operate the radiator to radiate the ejected material of the three-dimensional object on the platen, and to operate the cooler to attenuate heat produced by the radiated material in response to the signal from the sensor exceeding the predetermined threshold.

A method of operating a three-dimensional object printing system is also disclosed. The method in one embodiment comprises the steps of operating with a controller a heater to heat a surface of a platen, operating with the controller a plurality of ejectors to eject drops of material towards the surface of the platen to form layers of material with reference to digital image data of a three-dimensional object to produce the three-dimensional object on the surface of the platen, generating with a sensor a signal indicative of a temperature of the ejected material forming the three-dimensional object on the surface of the platen, operating with the controller a radiator to emit radiation to cure the ejected material forming the three-dimensional object on the surface of the platen, and operating with the controller a cooler to attenuate heat from the radiated material in response to the signal from the sensor exceeding a predetermined threshold.

BRIEF DESCRIPTION OF THE DRAWINGS

The foregoing aspects and other features of a three-dimensional object printer that compensates for thermal effects during higher speed printing of objects are explained in the following description, taken in connection with the accompanying drawings.

DETAILED DESCRIPTION

Figure 1:
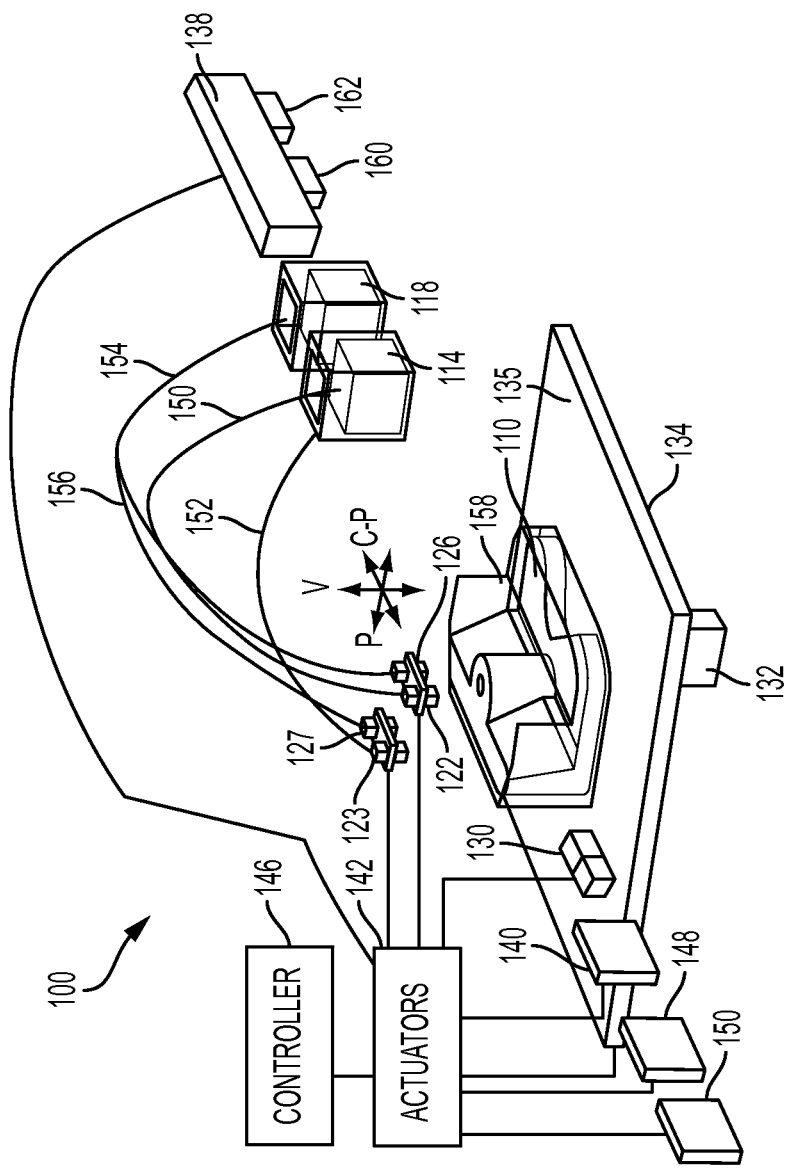
FIG. 1 is a partial perspective view side view of a three-dimensional object printing system with a planar support member, a leveler roll, a curing station, a cooling element, a heating element, and a conditioning station.

For a general understanding of the environment for the system and method disclosed herein as well as the details for the system and method, reference is made to the drawings. In the drawings, like reference numerals designate like elements.

FIG. 1 shows a configuration of components in a three-dimensional object printer 100, which produces a three-dimensional object or part 110. As used in this document, the term "three-dimensional object printer" refers to any device that ejects material with reference to image data of an object to form a three-dimensional object. The printer 100 includes a support material reservoir 114, a building material reservoir 118, four ejector heads 122, 123, 126, 127, a plurality of cooling elements 130 configured to cool the object 110, a heater 132, a planar support member 134, a conditioning station 138, a temperature sensor 140, actuators 142, a controller 146, a planarizer or leveler roll 148 and a cure station 150. Conduits 150, 152 connect the ejector heads 122, 123 to support material reservoir 114 and conduits 154, 156 connect ejector heads 126, 127 to building material reservoir 118. While four ejector heads 122, 123, 126, 127 are shown in FIG. 1, in other embodiments five, six, eight or any other desired number of ejector heads is utilized.

The one and possibly more actuators 142 are controlled by the controller 146 to control movement of the planar support member 134 and the ejector heads 122 23, 126, 127 relative to one another. That is, one or more actuators can be operatively connected to a structure supporting the ejector heads to move the ejector heads in a process direction and a cross-process direction with reference to the surface of the planar support member. Alternatively, one or more actuators can be operatively connected to the planar support member 134 to move the surface on which the part is being produced in the process and cross-process directions in the plane of the planar support member 134. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1.

Figure 2:
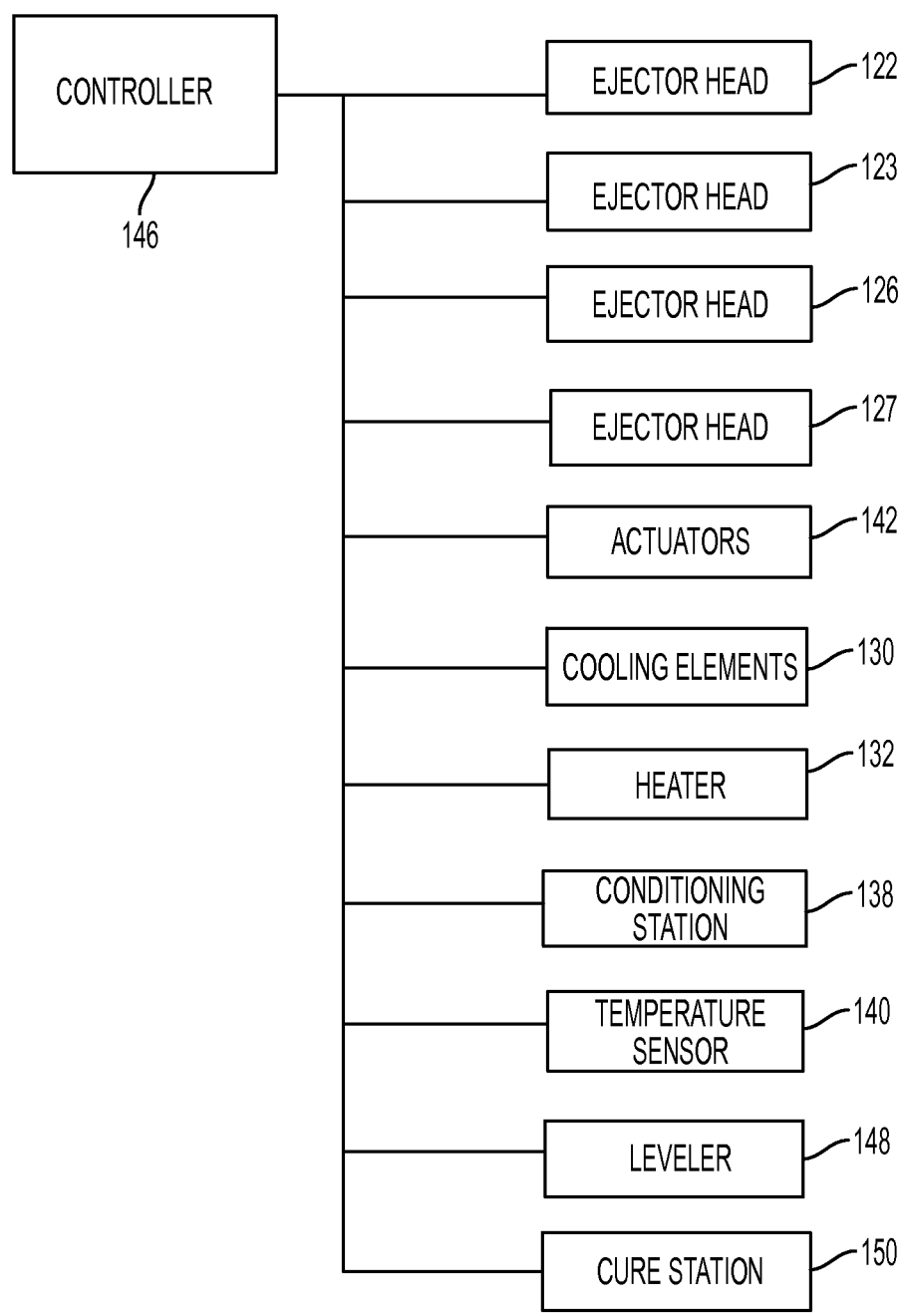
FIG. 2 is a diagrammatic view of components of the three-dimensional object printing system of FIG. 1 shown connected to a controller.

The ejector heads 122, 123, 126, 127 also move in a direction that is orthogonal to the planar support member 134. This direction is called the vertical direction in this document and is denoted with the letter "V" in FIG. 1. Movement in the vertical direction is achieved with one or more actuators operatively connected to the planar support member 134, by one or more actuators operatively connected to the ejector heads 122, 123, 126, 127, or by one or more actuators operatively connected to both the planar support member 34 and the ejector heads 122, 123, 126, 127. These actuators in these various configurations are operatively connected to the controller 46, which operates the actuators to move the planar support member 34, the ejector heads 122, 123, 126, 127, or both in the vertical direction. The controller 146 is operatively connected to the ejector heads 122, 123, 126, 127 (FIG. 2). In certain embodiments, the controller is configured to control the ejector heads to deposit the build materials and support materials with respect to image data on a single pass.

The actuators 142 are also operatively connected to the cooling elements 130, the conditioning station 138, the leveler roll 148, the temperature sensor 140, and the cure station 150. The controller 146 is configured to control the actuators 142 to control movement of the planar support member 134 and the cooling elements, the conditioning station 138, the leveler roll 148, the temperature sensor 140, and the cure station 150 relative to one another. That is, one or more actuators can be operatively connected to the structures supporting the cooling elements 130, the conditioning station 138, the leveler roll 148, the temperature sensor 140, and the cure station 150 to move the conditioning station, the leveler, the temperature sensor, and the cure station in a process direction and a cross-process direction with reference to the surface of the planar support member.

Alternatively, one or more actuators can be operatively connected to the planar support member 134 to move the surface on which the part is being produced in the process and cross-process directions in the plane of the planar support member 134 in order to move the part 110 with respect to the cooling elements 130, the conditioning station 138, the leveler roll 148, the temperature sensor 140, and the cure station 150. In the particular embodiment shown in FIG. 1, the planar support member 134 is a conveyor belt configured to move the object 110 with respect to the ejector heads 122, 123, 126, 127, the cooling elements 130, the conditioning station 138, leveler roll 148, and the cure station 150. The controller 146 is also operatively connected to the conditioning station 138, temperature sensor 140, planar support member 134, leveler roll 148 and cure station 150 (FIG. 2).

The controller 146 controls the temperature sensor 140 to track the temperature of the object 110 during the printing process, including deposition of material by the ejector heads 122, 123, 126, 127, leveled or planarized by the leveler roll 148, curing by the cure station 150, and temperature conditioning at the conditioning station 138. The temperature sensor 140 can be, for example, an infrared sensor or other well-known temperature measuring devices. In some embodiments, the temperature sensor 140 comprises a plurality of temperature sensors fixed or movable with respect to the ejector heads, leveler, cure station and conditioning station. In some embodiments, the temperature sensor 140 is configured to detect temperature at more than one location on the object 110. The temperature and quantity of air provided by the cooling elements 130 is then applied differently with respect to the temperature detected at a particular location.

Each of the ejector heads 122, 123, 126, 127 are also operated by the controller 146 with reference to three-dimensional object image data in a memory operatively connected to the controller to eject the support and building materials supplied to each respective ejector head in a print zone towards an upper surface 135 of the planar support member 134. The object 110 is formed substantially on a layer-by-layer basis in which build and support material are ejected at locations corresponding to the image data at each layer until the layers reach a corresponding object height and the object 110 has been formed. In some embodiments, each layer of build and support material is deposited by the ejector heads 122, 123, 126, 127 in a single pass of the ejector heads relative to the planar support member 134. In some embodiments, the material ejected to the support member is similar to polycarbonate or acrylonitrile butadiene styrene (ABS) material, and is UV curable. However, any desired material may be used.

In one particular embodiment, the build and support material is heated to a temperature of about 80 degrees Celsius prior to jetting by the ejector heads 122, 123, 126, and 127. After the material is jetted to the planar support member 134, the material quickly solidifies or reaches a gel state upon impacting the surface 135 of the planar support member or upon impacting the previous layer of deposited material.

The controller 146 also operates the heater 132 to heat the surface 135 of the planar support member 134 at the print zone to a desired temperature. The heater 132 may include heating elements (not shown) operatively connected to the planar support member to heat the support member 134. In other embodiments, the heating element includes a heat lamp, such as an infrared (IR) heat lamp, a microwave heater, a heating pad, or any other desired heating element. In some particular embodiments where the heater comprises an IR heat lamp, the IR heat lamp is an Adphos IR heat lamp with a 1 or 2 micron peak rate. However, any desired heater may be used.

After a layer of material has been ejected to the planar support member 134, the controller 146 controls the actuators 142 to move the planar support member 134 to a position with the partially formed object 110 beneath the leveler roll 148 to level the object 110, the UV cure station 150 to cure the UV curable build and support material, and the conditioning station 138 to further cool the part to a desired temperature to prepare the object 110 for another layer of material deposition.

The leveler roll 148 comprises a heated cylinder (not shown) with a smooth surface. The controller 146 controls the heated cylinder of the leveler roll 148 to rotate in engagement with the most recent layer formed, thereby melting, transferring, and removing portions of the most recent layer formed to provide a smooth and even surface for a subsequent layer of material to be ejected. The leveler further ensures the object 110 is at a correct height for material deposition of a subsequent layer. In some embodiments, the heated cylinder removes up to approximately 20% of the deposited material to provide a smooth layer with a well-defined thickness. A scraper (not shown) positioned with respect to the cylinder ensures that material that adheres to the cylinder is scraped from the cylinder and recycled or otherwise directed into, for example, a receptacle (also not shown).

The cure station 150 includes a radiation device 151 configured to direct radiation to the material ejected to the planar support member 134 by the ejector heads to cure the ejected material. In some embodiments, the radiation device 151 is a radiator that directs electromagnetic radiation to the object. In one particular embodiment, the radiation device 151 is an ultraviolet (UV) lamp, or a series of UV light emitting diodes (LEDs) that emit electromagnetic radiation in the UV spectrum towards the object 110 to cure the material forming the object. The conditioning station 138 is configured to control the temperature of a portion of the three-dimensional object 110 after each layer of material deposition in order to bring the temperature to an optimum range for further material deposition. If the temperature of the previous layer of the object 110 is too high during deposition of the next layer, the ejected material could not sufficiently solidify, causing layer-to-layer registration error. If the temperature of the previous layer of the object 110 is too low during deposition of the next layer, the material may have weaker adhesion toward the previous layer, causing anisotropic mechanical properties and premature mechanical failure, e.g., the Young's modulus is stronger in the X-Y direction, but weaker in the Z direction.

In the embodiment shown, the conditioning station 138 includes a cooling device 160 configured to cool the object 110 with respect to temperature sensed by the temperature sensor 140, and a heating device 162 configured to heat the object 110 with respect to temperature sensed by the temperature sensor 140, to ensure that the temperature of the object 110, and more particularly, the top surface temperature of the object 110, is within a certain range for building parts with the right registration, accuracy, surface finish, and mechanical properties. In some embodiments, a preferred temperature is slightly lower than the ink solidifying temperature to ensure a quick solidification of the material droplets, as well as good adhesion between the layers. This temperature is in a range of about 40 to about 50 degrees Celsius for some materials, but the temperature is correlated to the properties of the material. The cooling device 160 can be one or a number of fans configured to direct air towards the object 110, in which the controller is configured to control the air velocity and/or the temperature of the air directed from the one or more fans towards the ink. In some embodiments, the fans can be coupled to receive and blow refrigerated air or other gas from a suitable refrigerated gas source (not shown) under the control of the controller. Any desired type of cooling device may be used.

The heating device 162 of the conditioning station 138 is configured to heat the object 110. The heating device can be a heating element, such as a heat lamp, a microwave heating element, or any other desired heating element. The conditioning station 138 continues the cooling and heating process with respect to a temperature sensed by the temperature sensor 140 until the surface of the object 110 has reached a desired temperature. The object 110 is then brought to the print zone for another layer of material deposition by the ejector heads 122, 123, 126, 127, and the process of ejecting, leveling, curing and conditioning repeats layer by layer until the object 110 is formed.

The three-dimensional object printer 100 is further configured for active cooling of the object 110 when the object is in the printing zone, leveled by the leveler roll 148, and during curing in the curing station 150 with the cooling elements 130. The controller 146 operates the cooling elements 130 based on the temperature of the three-dimensional object 110 formed from temperature data from the temperature sensor 140. In a particular embodiment, the controller 146 is configured to control the cooling elements 130 to cool the object 110 to a desired curing temperature that enables efficient UV curing, when UV material is used. In the embodiment shown in FIG. 1, the cooling elements 130 comprise one or more cooling fans that circulate air in the printing zone. The flow rate produced by each fan, and the temperature of the air is variably controlled by the controller 146 to ensure that the temperature of the object is within a predetermined range. If the temperature is too high, one or more fans are operated to cool the three-dimensional object. In the embodiment shown in FIG. 1, the cooling elements 130 are separate from the ejector heads 122, 123, 126, 127. In other embodiments, the cooling elements may be positioned between the ejector heads. In some embodiments, the cooling elements are moved together with the ejector heads.

In one embodiment, the cooling elements 130 are controlled to maintain a temperature of the part's surface within a predetermined range to enhance the properties of the material, such as binding or another property as described above. In some embodiments, the particular range is selected dependent on, among other factors, the type of material ejected to form the object. The temperature range that provides the enhanced properties can be determined empirically. In certain embodiments, the selected range can be about 35° C. to about 100° C.; however, the selected range can be a range within this range depending upon the material being ejected and the empirical data. Moreover, as discussed in greater detail below, by controlling the heater 132, the cooling elements 130 and the conditioning station 138 with respect to the temperature detected by the temperature sensor 140, the temperature gradient through the thickness of the object 110 can be precisely maintained within a desirable range.

In some embodiments, the temperature sensor 140 is controlled to continue to detect temperature of the object 110, and the heater 132, the cooling elements 130 and the conditioning station 138 are controlled to maintain a desired temperature gradient of the object 110 outside of the print zone, while the object 110 is leveled by the leveler roll 148, cured by the cure station 150, and cooled or heated by the conditioning station 138. Therefore, in certain embodiments, the controller 146 is configured to collect temperature data of the object 110, and, in particular, the surface of the object 110, throughout the entire printing process. Based on the detected temperature, the controller 146 controls the cooling element 130, the heater 132 and the cooling device 160 and heating device 162 of the conditioning station 138 to ensure that the temperature of the surface of the object 110 is within an optimum range during the entire printing process including material deposition, leveling, and curing of each layer.

The use of multiple printheads has been proposed to increase speed by depositing build materials and support materials at a higher jetting frequency and in fewer passes of the printheads, such as a single pass. However, problems are associated with the higher jetting frequency and lower number of passes. For example, the volume of build material and support material ejected during printing can be up to approximately 10 times higher than previous three-dimensional printers, and the increased volume of material may be ejected within even a shorter time period. During deposition, heated ink droplets ejected by the printer can raise the temperature of the portion of the part already formed, thereby detrimentally affecting displacement accuracy of ejected material. In addition, when UV curable build and support materials are used, the curing process used to cure the layers of UV ink ejected by the printheads is an exothermic process. When UV curable ink is utilized, after each layer of build and support material is ejected to the planar support member 34, the planar support member 34 moves the object 10 past the UV cure station 38, and emitters (not shown) in the UV cure station emit electromagnetic radiation in the UV spectrum towards the object 110 to cure the ink.

Figure 3:
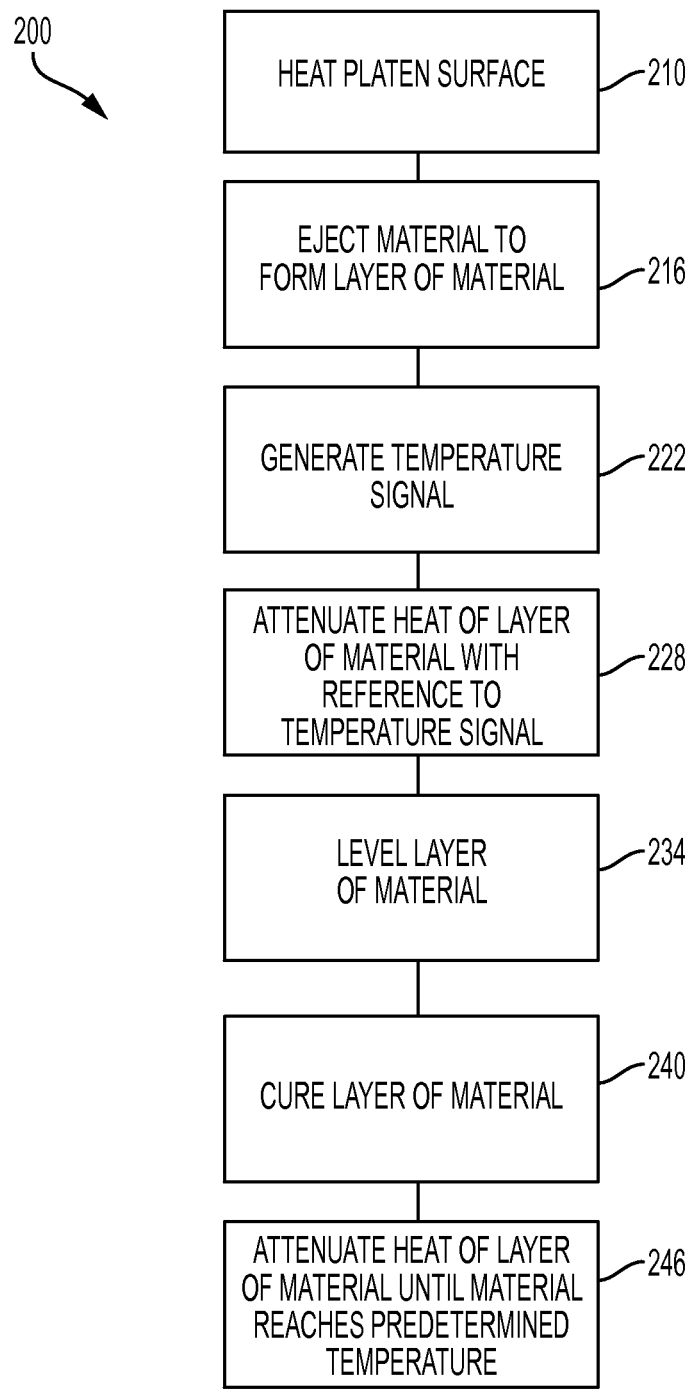
FIG. 3 is a diagrammatic view of a method of operating the three-dimensional object printing system of FIG. 1.

FIG. 3 depicts a method 200 of operating a three-dimensional printer to form a three-dimensional object on a layer by layer basis. The process begins with a heater being operated under the control of a controller to heat a surface of a platen of a three-dimensional object printer (block 210). A plurality of printheads are operated under control of the controller to eject drops of material towards the surface of the surface of the platen to form layers of material with reference to digital image data of a three-dimensional object to produce the three-dimensional object on the surface of the platen (block 216). A temperature sensor generates a signal indicative of the temperature of a layer of material formed on the printing surface (block 222) and a cooling element is controlled to attenuate heat from the ejected material on the surface of the platen with reference to the signal indicative of the temperature of the material formed on the printing surface (block 228). A leveler is controlled to level the surface of the three-dimensional object formed on the surface of the platen (block 234) and a radiator is controlled by the controller to emit radiation to cure the ejected material on the platen (block 240). A cooling device of a conditioning station is controlled by the controller to attenuate heat from the ejected material on the surface of the platen until the material reaches a predetermined temperature (block 246).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A three-dimensional object printing system comprising:
a plurality of ejectors configured to eject drops of material;
a platen positioned opposite the plurality of ejectors for formation of a three-dimensional object on a surface of the platen with the ejected drops of material;
a heater configured to heat the surface of the platen, a plurality of sensors, each sensor being configured to generate signals corresponding to a surface temperature of a portion of the three-dimensional object opposite the sensor;
a radiator configured to direct radiation onto the ejected drops of material of the three-dimensional object;
a conditioning station having a cooling device and a heating device;
a plurality of cooling elements, each cooling element being configured to cool the ejected drops of material of the three-dimensional object;
a plurality of actuators operatively connected to the plurality of cooling elements, the radiator, the plurality of sensors, and the conditioning station, the plurality of actuators being configured to move the plurality of cooling elements, the radiator, the plurality of sensors, and the conditioning station independently of one another and relative to the three-dimensional object; and
a controller operatively connected to the plurality of ejectors, the heater, the plurality of sensors, the radiator, the plurality of actuators, the conditioning station, and the plurality of cooling elements, the controller configured to:
operate the plurality of ejectors to eject the drops of material towards the platen to form layers of material using digital image data of the three-dimensional object to form the three-dimensional object on the surface of the platen;
operate the heater to heat the surface of the platen selectively to maintain a temperature of the platen at a predetermined temperature;
compare the signals received from the plurality of sensors to at least one predetermined temperature range;
operate at least one actuator in the plurality of actuators to move the radiator to positions opposite the object selectively and operate the radiator to radiate the ejected drops of material of the three-dimensional object on the platen;
operate one or more actuators in the plurality of actuators to move the sensors in the plurality of sensors independently to different locations opposite the three-dimensional object so each different location has a different sensor opposite the different location and to move the cooling elements in the plurality of cooling elements independently to the different locations opposite the three-dimensional object so each different location has a different cooling element opposite the different location;

operate the cooling elements opposite the different locations to attenuate heat at the different locations by varying a temperature and quantity of air directed by the cooling elements toward the different locations using the surface temperature indicated by the signals from the sensor opposite each one of the different locations on the three-dimensional object;

operate at least one other actuator to move the conditioning station relative to the three-dimensional object on the platen; and operate the heater, the cooling elements, and the heating device and the cooling device of the conditioning station using the surface temperature indicated by the signals from the sensor opposite each one of the different locations on the three-dimensional object to maintain a temperature gradient through a cross-section of the three-dimensional object and continue operation of the heater, the cooling elements, and the heating device and the cooling device of the conditioning station using the surface temperature indicated by the signals from the sensor opposite each one of the different locations on the three-dimensional object until the three-dimensional object has been formed on the surface of the platen.

2. The three-dimensional object printing system of claim 1, the controller being further configured to operate the heater, the cooling elements, and the heating device and the cooling device of the conditioning station until the three-dimensional object reaches a predetermined height; and operate the radiator to cure at least a portion of the three-dimensional object when the three-dimensional object reaches the predetermined height.

3. The three-dimensional object printing system of claim 1, the controller being further configured to operate operation of the heater, the cooling elements, and the heating device and the cooling device of the conditioning station to maintain a surface temperature of the three-dimensional object at the different locations within the at least one predetermined temperature range.

4. The three-dimensional object printing system of claim 1, the controller being further configured to operate the heater, the cooling elements, and the heating device and the cooling device of the conditioning station until a predetermined number of layers of material are formed for the three-dimensional object.

5. The three-dimensional object printing system of claim 2, the controller is further configured to:

operate the radiator to radiate the drops of ejected material on at least one of the different locations to cure the ejected drops while the controller continues to operate the heater, the cooling elements, and the heating device and the cooling device of the conditioning station to maintain the temperature gradient.

6. The three-dimensional object printing system of claim 5, the controller is further configured to:

operate the heater, the cooling elements, and the heating device and the cooling device of the conditioning station after the radiator terminates radiation of the drops of ejected material on the at least one of the different locations.

7. The three-dimensional object printing system of claim 1 wherein the radiator is configured to emit radiation with a wavelength in an ultraviolet wavelength range.

* * * * *